(12) United States Patent
Dreyer et al.

(10) Patent No.: US 9,577,234 B2
(45) Date of Patent: Feb. 21, 2017

(54) SEPARATOR MATERIAL FOR FORMING A SEPARATOR FOR A LEAD-ACID ACCUMULATOR

(75) Inventors: Daniel Dreyer, Mackenheim (FR); Jean-Martial Caublot, Ebersheim (FR)

(73) Assignee: Daramic, LLC, Charlotte, NC (US)

( * ) Notice: Subject to any disclaimer, the term of this patent is extended or adjusted under 35 U.S.C. 154(b) by 844 days.

(21) Appl. No.: 10/560,548

(22) PCT Filed: Jun. 11, 2004

(86) PCT No.: PCT/EP2004/006307
§ 371 (c)(1),
(2), (4) Date: Jan. 30, 2006

(87) PCT Pub. No.: WO2004/112166
PCT Pub. Date: Dec. 23, 2004

(65) Prior Publication Data
US 2006/0141350 A1      Jun. 29, 2006

(30) Foreign Application Priority Data

Jun. 13, 2003   (DE) .................................. 103 27 080

(51) Int. Cl.
*H01M 2/14*       (2006.01)
*H01M 2/16*       (2006.01)
(Continued)

(52) U.S. Cl.
CPC ............... *H01M 2/145* (2013.01); *H01M 2/14* (2013.01); *H01M 2/1686* (2013.01); *H01M 2/18* (2013.01);
(Continued)

(58) Field of Classification Search
CPC ........ H01M 2/14; H01M 2/18; H01M 2/1686; H01M 2/1613; H01M 2/145; H01M 2/1653; H01M 2/1666; H01M 10/06; Y10T 428/2457; Y10T 428/2462; C04B 32/005; C04B 41/48
(Continued)

(56) References Cited

U.S. PATENT DOCUMENTS 2,565,868 A * 8/1951 Mann et al. ............... 356/237.6
3,159,507 A * 12/1964 Abbe et al. .................. 429/145
(Continued)

FOREIGN PATENT DOCUMENTS

DE         29 24 239       12/1979
DE         33 35 547       4/1985
(Continued)

OTHER PUBLICATIONS

Abstract and Machine Translation in English of JP 09-306463.*
Abstract in English of JP 55-146872.*
The International Search Report dated Dec. 15, 2005.

*Primary Examiner* — Carlos Barcena
*Assistant Examiner* — Wojciech Haske
(74) *Attorney, Agent, or Firm* — Meunier Carlin & Curfman LLC

(57) ABSTRACT

The invention relates to a separator material (6) for forming a separator for a lead-acid accumulator, especially in the form of unfinished rolled product, and a method for the production thereof. The inventive separator material (6) comprises a first layer in the form of a microporous film (1) and at least one second layer in the form of a planar fleece material (7). At least one face of the microporous film (1), which is made of a thermoplastic material, is provided with a number of protrusions (2, 2') defining an area with an increased film thickness on a basic film sheet. The fleece material (7) is welded to the film (1) by means of ultrasonic welding in such a way that the planar fleece material (7) is located at least at the level of the surface of the basic film (Continued)

sheet without invading the same in the area of the welded joints (8).

28 Claims, 2 Drawing Sheets

(51) Int. Cl.
*H01M 2/18* (2006.01)
*H01M 10/06* (2006.01)

(52) U.S. Cl.
CPC ......... *H01M 2/1613* (2013.01); *H01M 2/1653* (2013.01); *H01M 2/1666* (2013.01); *H01M 10/06* (2013.01); *Y10T 428/2457* (2015.01); *Y10T 428/2462* (2015.01)

(58) Field of Classification Search
USPC .......... 429/145, 147; 29/25.03, 623.1–623.5; 264/41, 211.2, 177.19; 156/379
See application file for complete search history.

(56) References Cited

U.S. PATENT DOCUMENTS

| | | | | |
|---|---|---|---|---|
| 3,210,218 | A | * | 10/1965 | Motochika et al. ........ 264/211.2 |
| 3,351,495 | A | | 11/1967 | Bowie et al. ................. 136/146 |
| 5,470,676 | A | | 11/1995 | Nakano ........................ 429/139 |
| 5,558,952 | A | | 9/1996 | Knauer ......................... 429/139 |
| 5,716,734 | A | | 2/1998 | Nakano ........................ 429/143 |
| 5,776,630 | A | | 7/1998 | Bohnstedt .................... 429/143 |
| 6,329,650 | B1 | | 12/2001 | Dudnikov ..................... 250/251 |
| 2001/0020319 | A1 | * | 9/2001 | Farahmandi et al. ........ 29/25.03 |
| 2003/0129486 | A1 | * | 7/2003 | Bohnstedt et al. ........... 429/143 |

FOREIGN PATENT DOCUMENTS

| | | |
|---|---|---|
| EP | 0 121 771 | 10/1984 |
| EP | 0 484 295 | 5/1992 |
| EP | 0 899 801 | 3/1999 |
| JP | 55146872 A * 11/1980 | ............. H01M 2/16 |
| JP | 09306463 A * 11/1997 | |
| WO | 01/13442 | 2/2001 |
| WO | 03/026038 | 3/2003 |

\* cited by examiner

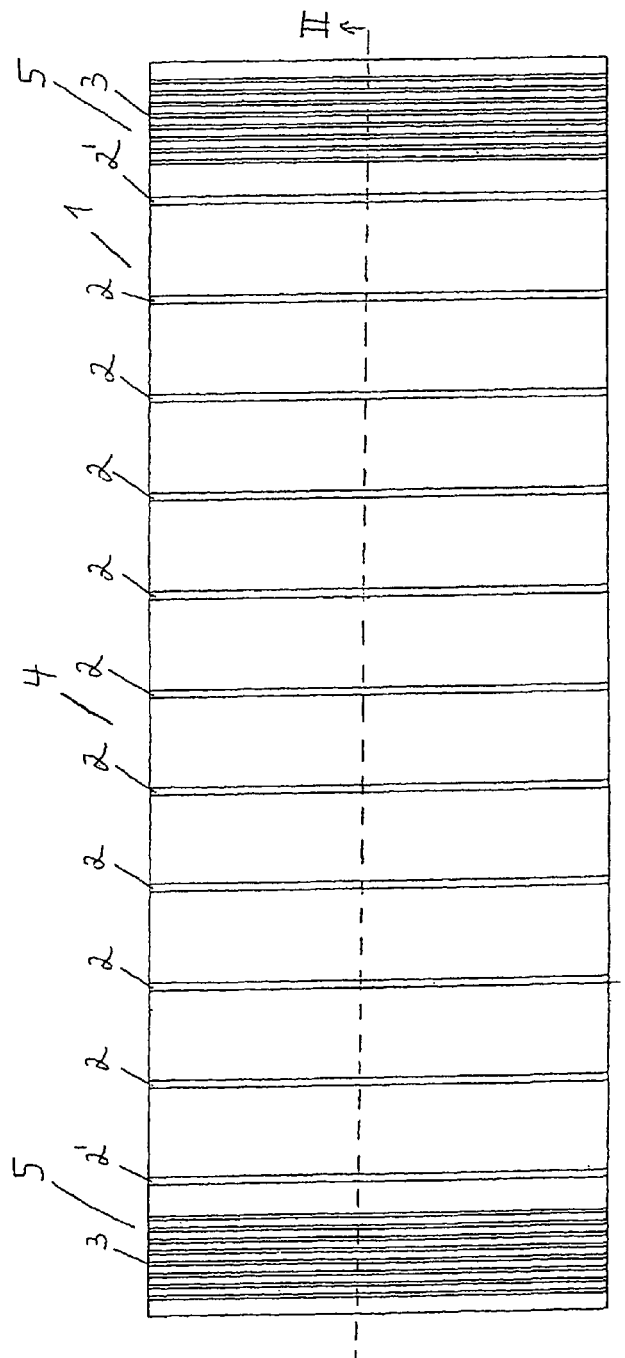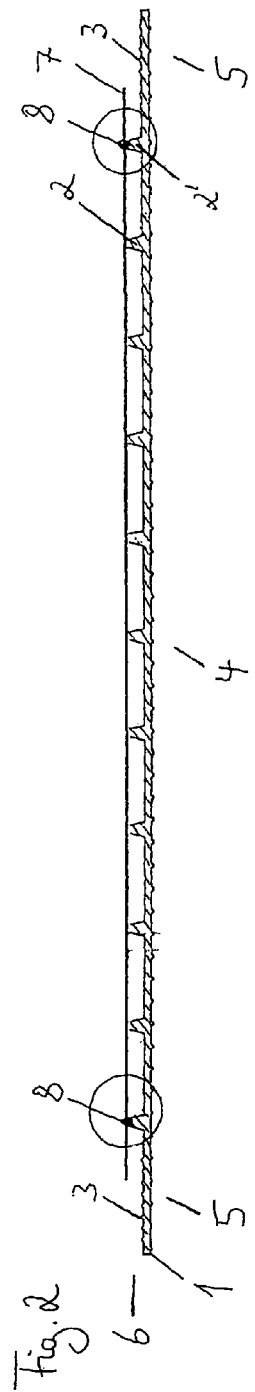

SEPARATOR MATERIAL FOR FORMING A SEPARATOR FOR A LEAD-ACID ACCUMULATOR

The invention relates to a separator material for forming a separator for a lead-acid accumulator, and to a process for the production of such a separator material.

In acid accumulators, separators are located between adjacent electrode plates of different polarity and serve, inter alia, as electrical insulators, in order to prevent metallic conduction between the plates as a result of direct contact between them. At the same time, however, the separators must allow an ionic current flow in the electrolyte between the electrodes. In order to fulfil this multiple function, the separators usually comprise microporous films, the pores of which are as small as possible, in order to prevent electrical short circuits between the plates, for example by dendritic growth or by particles which become detached from the plates, and the porosity of which is as high as possible, in order to minimize the internal resistance of the accumulator. For the same reason, it is moreover also desirable for the separators to be as thin as possible in construction.

Such separators are in general produced from an oxidation-stable material in the form of a thermoplastic which can endure in the aggressive electrolyte over the life of the accumulator. The separators are usually shaped into pockets, for example by folding and welding at the sides, into which the positive or negative electrode plate is inserted.

In use, oxygen is generated at the positive plates during the charging operation, and this can attack the separator material and finally damage it such that short circuits occur between the plates. For this reason, in many cases at least one face of the separators is provided with ribs or other raised areas which serve as spacers in order to avoid direct contact of the separator base sheet at least with the positive electrode plate.

Numerous various arrangements of rib-like spacers are known in the prior art. Thus, separators are known which have a number of vertical ribs which run over the entire length of the separator and are located at regular intervals of, for example, 6 to 13 mm. A typical separator for starter batteries thus comprises about 12 to 25 ribs over a width of approximately 160 mm. In the separator of U.S. Pat. No. 5,558,952, the continuous ribs are replaced by discontinuous ribs.

In addition to fulfilling the tasks mentioned, separators usually also have a number of further functions which are important for the functional capacity of the accumulator. Thus, the active material of the electrode plates periodically changes its chemical composition during the charging and discharging cycles of the accumulator. As a result of this change and as a result of external influences, for example in the form of mechanical impacts or vibrations, some of the active material can become detached, in particular from the positive plates. The associated loss of active material, in particular from the positive electrode, results in an increasing decrease in the charging capacity of the accumulator. Furthermore, the active material which has fallen off can collect as sediment at the bottom of the accumulator cell and finally, in particular in the case of sheet separation, lead to a short circuit between electrodes of different polarity and thus to a premature failure of the accumulator. It is known to prevent the thus disadvantageous falling off of active material by means of a fleece material, for example a glass fibre fleece or a polyester fleece or a fleece of a mixture of polyester fibres and glass fibres, which is located between the microporous film and the positive plate and is pressed against these. The cycle stability of the accumulator can also be increased in this manner.

DE 29 24 239 C2 discloses a microporous laminated material for use as a separator. The laminated material comprises a first layer of a microporous thermoplastic or heat-curable, or thermosetting, polymer material which is laminated all over with a second layer of a non-woven fibre web which consists to 100% of polyester fibres and is bonded by heat. The laminating can take place by the action of the two rolls in a conventional twin-roll calender, into the roll nip of which the polyester fibre web and the extruded microporous material are introduced simultaneously. Alternatively, the laminating can also take place in a triple-roll calender. This process is difficult to carry out and is not suitable for all uses. Thus, for example, it is not possible to laminate the polyester fibre web in an advantageous manner on to a face of the microporous material which is provided with ribs and is to face the positive electrode during use, or to separate the two components from one another and to reuse them. It is also difficult to produce separators in which the polyester fibre web is narrower than the separator by simultaneous extrusion of several separator widths, which is conventional for reasons of problem-free weldability of the separator and saving in fleece material. Finally, so that it can be bonded to the fibre web, the polymer material must be, for example, still in solution or in the non-crosslinked state, so that it can penetrate into the fibre web when passing through the calender.

DE 33 35 547 C1 discloses a weldable planar web material for forming separator pockets. The web material comprises a film material which is in the form of a web to which a fleece material is applied, for example by gluing. The fleece material can be a glass fibre fleece or a polyester fleece. In order to allow the formation of pockets by welding at the sides, the side dimension of the fleece layer is chosen such that the edge areas of the film material are not covered by the fleece.

For a fixing of the fleece to the microporous film which is secure, permanent and easy to handle in production terms, the two components have in most cases been glued to one another in the prior art. This gluing and in particular the metering of the adhesive applied has proved to be problematic. On the one hand there is the risk of too small an amount being applied, with too low a hold of the fleece associated therewith. On the other hand, if too large an amount of adhesive is applied, the adhesive can penetrate through the fleece, so that the separator rolls formed in the further course of the production stick and become unusable. For this reason, it is necessary for the fleece to have a minimum thickness of about 0.3 mm (measured with a load of 10 N for a measurement area of 100 $cm^2$). It was not possible to employ thinner and therefore less expensive material without quality and economic disadvantages. Gluing moreover has the disadvantage that if too large an amount of adhesive is applied, the electrical resistance of the accumulator increases, and that certain adhesives can contaminate the electrolytes such that the electrical properties of the accumulator are impaired. Mechanical processes for bonding the fleece to the microporous film, such as the lamination by calendering already discussed above or pressure welding between two toothed wheels which comb with one another, the action of which can lead to a deformation or perforation of the film, are not alternatives, since sufficiently high processing speeds cannot be achieved with them and a sufficiently strong bond cannot be achieved with pressure welding.

It is an object of the present invention to construct a separator which comprises a first layer of a microporous film and a second layer of a planar fleece material such that its production is simple and inexpensive and the disadvantages mentioned are eliminated. It is furthermore an object of the invention to provide a process for the production of such a separator which is simple to use, without limitations.

The features of the independent patent claims serve to achieve these objects. Advantageous versions of the invention are the subject-matter of the particular associated sub-claims.

According to the present invention, a separator material for forming a separator for a lead-acid accumulator, in particular in the form of unfinished rolled product, is constructed such that it comprises a first layer in the form of a microporous sheet and at least one second layer in the form of a planar fleece material. The microporous sheet is made of a thermoplastic and has a number of protrusions at least on one face. In this context, the protrusions are solid and are preferably formed integrally with the base sheet, so that they form sheet areas of increased thickness. In this connection, the cross-section dimensions of the microporous sheet perpendicular to the plane of the sheet can be characterized by the sheet thickness away from the protrusions (i.e. the thickness of the base sheet), by the sheet thickness in the area of a protrusion and by the height of the protrusions (i.e. the difference between the sheet thickness in the area of a protrusion and the sheet thickness away from the protrusions). The planar fleece material can comprise any type of non-woven materials which are compatible with the aggressive accumulator environment. Such a fleece material is located at least on a face of the sheet which has protrusions. If the sheet has protrusions on both faces, fleece material can be located on both faces or only on one face. The fleece material is fixed to the sheet by welded joints between the fleece material and the sheet such that the planar fleece material is at least at the level of the surface of the sheet base sheet (i.e. at the level of the surface of the sheet in areas without protrusions) in the area of the welded joints and does not penetrate into this. This means that the surface of the planar fleece material facing the sheet is not located below the level of the surface of the base sheet in the area of the welded joints. In this context, the particular welded joints are made with the sheet face on which the corresponding planar fleece material is located. It is preferable in this context if the planar fleece material is bonded by the welded joints to at least some of the protrusions of the sheet, so that the welded joints are then each located on a protrusion of the sheet.

This development according to the invention has the advantage that—as is described in detail below—very thin fleece materials can be fixed to the microporous sheet by ultrasonic welding without there being the risk of development of weak points and holes in the microporous sheet. This results in sufficiently high processing speeds for a production environment and, due to the possibility of using thin fleeces, preferably having a thickness of less than 0.25 mm, and in particular having a thickness of between 0.1 and 0.25 mm, the need for a smaller amount of fleece. Separator materials of the present invention can be produced less expensively than known such materials in this manner.

In a preferred version, at least some of the protrusions are constructed as ribs which run vertically and can extend over the entire length of the separator material and can be discontinuous or continuous. For a separator material in the form of a web, the vertical direction is the web direction. In this context, it is preferable if in each case one of these ribs runs in one of the side edge areas of the sheet and the fleece material is bonded to the sheet at the sides by in each case a weld seam which runs on these two side ribs. It is to be noted that the welding in this context can take place such that the particular rib with which the welding takes place disappears completely during the welding process, so that the fleece material is at the level of the surface of the film base sheet in the area of the weld seam. For an advantageous bonding, the weld seams should run as close as possible to the edge of the separator material. However, it is to be noted in this context that it is advantageous not to cover narrow edge areas of the sheet with fleece material, in order to facilitate the formation of pocket by welding the separator material at the sides, the width of these edge areas in a preferred development in each case being between 5.5 and 9.5 mm. It is preferable for the two side ribs to be continuous ribs. The weld seams are preferably continuous, but can also be discontinuous.

It is also possible for the sheet and the fleece material to be only spot-welded to one another.

In a preferred development, the microporous sheet is made of a polyolefin. In this context, it is particularly preferable if the polyolefin has a molecular weight of at least 300,000, a melt index under normal conditions of substantially 0 and a viscosity number of not less than 600 ml/g. A suitable polyolefin is polyethylene, in particular a polyethylene having a filler content of silica.

It is furthermore preferable for at least 50% of the pores of the microporous sheet to have a diameter of 0.5 µm or less. It is also preferable if the microporous sheet in areas without protrusions has a thickness of from 0.1 to 0.6 mm, more preferably from 0.15 to 0.25 mm and most preferably of about 0.2 mm.

The fleece material, for example, can substantially consist of glass fibres or more preferably substantially polyester fibres. Fleece materials which comprise a mixture of glass fibres and polyester fibres are preferred, it being particularly advantageous if the content of glass fibres in the mixture is not more than 70 wt. %. These have the advantage that they are easy to handle, that knives do not rapidly become blunt during cutting, and that they are easy to cut and give clean cut edges. It is furthermore preferable if the fleece material has a thickness of from 0.1 to 0.25 mm (measured with a load of 10 N for a measurement area of 100 cm$^2$). However, it is also possible to use other fleece materials which are stable in the aggressive environment in the accumulator and can be welded with the microporous film.

Such a separator material can be produced according to the invention by first providing the abovementioned microporous film and, for each face of the film on to which a fleece material is to be applied, one of the planar fleece materials described above. The planar fleece material is or the planar fleece materials are then laid on a face of the film having protrusions and welded with at least some of the protrusions of the film in a manner such that the planar fleece material is located at least at the level of the surface of the film base sheet in the area of the welded joints and does not penetrate into this. During welding, the corresponding protrusions melt at least in part, so that under certain circumstances material of these protrusions can leave the corresponding original protrusion areas and can thus cause a change in shape, such as, for example, a decrease in the height of the protrusions. In this context, the fleece material does not have to be laid completely on the sheet before the welding. Rather, the microporous film and the at least one fleece material can also be gradually laid on one another in sections or continuously and gradually welded in sections or continuously. In order to achieve a good bond, it is preferable to press the planar fleece material against the protrusion of the film before the welding.

In a preferred version, the welding is carried out by means of ultrasonic welding. Welding by a thermowelding process, in which electrical energy is converted directly into the heat required for the welding, is also possible.

Ultrasonic welding is preferred, since in the case of the sheet and fleece materials which are preferred according to the invention, it allows processing speeds of at least 90 m/min, and preferably of at least 100 m/min, and is characterized by short reaction times without long heating up and cooling times.

It is furthermore preferable if at least some of the protrusions of the microporous sheet have a height of from 0.5 to 0.6 mm and welding takes place with these protrusions. In this context, the height of the protrusions in question can decrease during the welding.

The fleece material preferably has a thickness of from 0.1 to 0.25 mm.

The invention is explained in more detail in the following by preferred embodiments with the aid of the drawings.

FIG. 1 shows a plan view of one face, provided with ribs, of a section of a microporous sheet before application of a planar fleece material.

FIG. 2 shows a section through the microporous sheet of FIG. 1 along the line II-II, a planar fleece material being applied to the microporous film.

Figure 3:
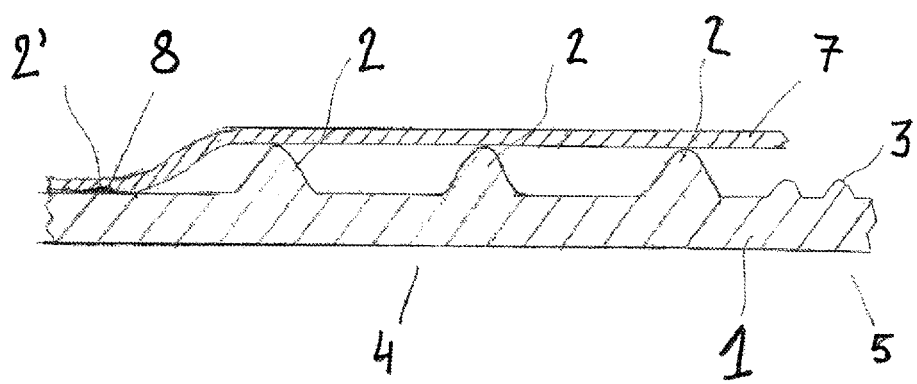
FIG. 3 is a view showing a planar fleece material bonded to the film such that the fleece material is located at the level of the surface of the base sheet and does not penetrate into said surface.

The microporous film 1 shown in plan view in FIG. 1 has, in a middle area 4, a number of continuous ribs or protrusions 2, 2' which run in the vertical direction and are distributed at regular intervals over the width. In this example, the distance between the ribs is 12.5 mm, and eleven ribs are provided. However, there can also be more or fewer ribs and/or the ribs can be at a longer or shorter distance. In the side edge areas 5, the film 1 in each case has a number of more densely spaced vertical ribs or protrusions 3. In this example, the side edge areas 5 comprise six ribs per cm, it being possible, however, for this number also to be greater or smaller.

The number of ribs 3 in the side edge areas 5 can thus be, for example, greater and approximately at least ten to twelve per cm, such as is disclosed, for example, in EP 0 899 801 A1. However, it is also possible to provide fewer ribs 3 or to dispense with the ribs 3 entirely. Instead of the ribs 3 which run in the vertical direction, a plurality of short, vertically spaced horizontal or angled ribs, such as are disclosed, for example, in U.S. Pat. No. 5,716,734, or also a combination of densely spaced vertical ribs and vertically spaced ribs which intersect these, such as is disclosed in U.S. Pat. No. 5,558,952, can be provided. Finally, it is also possible to provide, instead of ribs 3, edge areas 5 of increased thickness, for example a thickness increased by the factor of two compared with the middle area 4, such as is described in EP 0 484 295 B1.

The arrangement and construction of the ribs 2, 2' shown in the middle area 4 of the sheet 1 are given only by way of example. Thus, the continuous ribs 2, 2' can be replaced by discontinuous ribs. U.S. Pat. No. 5,558,952 discloses discontinuous ribs, the sections of which have a length of not more than 1 cm, and preferably of not more than 0.5 cm, the intermediate spaces between the sections preferably being at least twice as long as the sections. Alternatively or in addition to the vertical ribs 2, 2', the microporous sheet 1 can also have a number of continuous ribs which run in the transverse direction, such as is disclosed in U.S. Pat. No. 5,776,630. WO 01/13442 discloses a separator in the form of a microporous sheet which has a plurality of burl-like protrusions (studs) distributed regularly over at least one of its faces and at least one, and preferably two to four continuous, vertical rib in a middle area. It is preferred to use at least one rib 2' in each case which preferably continuous runs vertically in each edge area of the middle area 4 of the film 1. In accordance with the character of the film shown in FIGS. 1 and 2 which, as has already been stated is given merely by way of example, any embodiment mentioned for the ribs and/or protrusions in the middle area 4 can of course be combined with any embodiment mentioned for the ribs and/or protrusions in the side edge areas 5. However, the embodiment shown in FIGS. 1 and 2 with continuous ribs 2, 2', 3 which run in the vertical direction in the middle area 4 and in the side edge areas 5 is preferred.

The microporous sheet 1 is, as is preferable for every microporous sheet according to the invention, produced from a plastic, such as, for example, polyolefin, polypropylene, polyvinyl chloride or a mixture of these, or from another suitable material which is sufficiently stable in the aggressive environment in the acid accumulator. The preferred material is polyolefin, such as, for example, polypropylene, ethylene/butene copolymer and, preferably, polyethylene, more preferably high molecular weight polyethylene, i.e. polyethylene having a molecular weight of at least 300,000, and in particular of more than 600,000, even more preferably ultra-high molecular weight polyethylene, i.e. polyethylene having a molecular weight of at least 1,000,000, in particular of more than 4,000,000, and most preferably of more than 5,000,000 (measured by viscometry and determined in accordance with Margolie's equation, see Josef Berzen, CZ Chemie-Technik, volume 3 1974, no. 4, p. 129), a melt index of substantially 0 (measured in accordance with ASTM D1238 (condition E) using a standard load of 2,160 g) and a viscosity number of not less than 600 ml/g, more preferably of not less than 1,000 ml/g, even more preferably of not less than 2,000 ml/g and most preferably of not less than 3,000 ml/g (determined in a solution of 0.02 g polyolefin in 100 ml decalin at 130° C.).

The microporous sheet 1 comprises, as is preferable for every microporous sheet according to the invention, a homogeneous mixture of 8 to 100 percent by volume of polyolefin, 0 to 40 percent by volume of a plasticizer and 0 to 92 percent by volume of an inert filler material. The preferred filler material is finely divided silicon dioxide. Preferred plasticizers are oils, in particular mineral oils or process oils obtained therefrom. Since the plasticizer is that component which can be removed most easily from the mixture of polymer, filler material and plasticizer, it serves to render the film porous. The final composition of the microporous film depends on the composition of the original mixture and the component or components extracted. Materials of this type are known in the prior art and are described, for example, in U.S. Pat. No. 3,351,495.

The pore size of a microporous sheet according to the invention, such as the microporous sheet 1, is preferably less than 1 μm in diameter. Preferably, more than 50% of the pores have a diameter of 0.5 μm or less. In this context, it is particularly advantageous if at least 90% of the pores have a diameter of less than 0.7 μm.

FIG. 2 shows a section through a finished separator material 6, that is to say a section through a microporous sheet 1 with the planar fleece material 7 applied. It can be seen that the ribs 3 in the side edge areas 5 have a significantly lower height than the ribs 2, 2' in the middle area 4 of the film 1. Although the film 1 shown has the ribs 2, 2' on only one face, it is possible for ribs 2, 2' and/or ribs 3 also to be provided on the other face.

The thickness of the base sheet of the sheet 1 is preferably 0.1 to 0.6 mm, more preferably 0.15 to 0.25 mm, and most preferably about 0.2 mm.

The ribs 2, 2' in the middle area 4 of the sheet 1 preferably have a height of approximately 0.3 to 1.3 mm, and more preferably of about 0.4 to 0.9 mm, before welding with the planar fleece material 7. It is particularly preferable if the height of the ribs 2, 2' is approximately 0.5 to 0.6 mm. The base width of the ribs is about 0.5 to 1.5 mm, and preferably 0.6 to 0.8 mm. In addition to the preferred trapezoidal cross-section shown, the ribs can have any suitable cross-section, such as, for example, a circular, rectangular or triangular cross-section. These possible rib geometries and dimensions given by way of example can also be applied to all the possible ribs mentioned above. For the development of protrusions which are suitable in the context of the present invention, it is decisive that sufficient additional sheet material is provided by them in parts of the sheet in order to render possible welding of a fleece material with the sheet, without there being the risk of the development of weak points or holes. In this context, this additional sheet material can be such that the welded joint runs in a sheet area which is thickened compared with the base sheet, or also such that it is removed almost completely from the area of the welded joint after the welding, and the fleece material runs in these areas at the level of the surface of the film base sheet, but without penetrating into this. In respect of the welded joint, the suitable form of the protrusions, which the person skilled in the art can easily discover, accordingly depends, inter alia, on the material and the dimensions of the film, the composition and the dimensions of the fleece and the welding process chosen.

As can be seen from FIG. 2, a planar fleece material 7 is located on the sheet 1. The fleece material 7 is bonded to the outermost two ribs 2' by means of two weld seams 8 extending over the entire length of the sheet 1. The weld seams 8 run on ribs 2' along their entire length. However, it is also possible to provide discontinuous weld seams, down to individual spot-welded points. A fleece material which is suitable in the context of the present invention is, for example, a fleece having a fleece weight of 25 g/m$^2$, a fibre composition of 80% PET fibres and 20% PET melt fibres (PET is the abbreviation for polyethylene terephthalate), an average fibre diameter of 3 dtex and an average fibre length of 15 mm.

In FIG. 2, the ribs 2' have the same height as the ribs 2. In accordance with the above description, the welding can also take place, however, such that the height of the ribs 2' decreases compared with the ribs 2. In this context, the height of the ribs 2' can also be reduced to zero.

The welding takes place by means of ultrasonic welding. This process allows processing speeds of at least 90 m/min in a very advantageous manner. Thermoplastic microporous films having other arrangements of ribs and/or protrusions of other types can be bonded to fleece material in this manner, and such separator materials are likewise separator materials of the invention. For example, all of the abovementioned microporous films can be used, e.g. the microporous film with thickened edge areas which is known from EP 0 484 295 B1, in which case the weld seams would then run on the thickened edge areas.

The invention claimed is:

1. Separator material for forming a separator for a lead-acid accumulator, wherein the separator material comprises a first layer in the form of a microporous film, and at least one second layer in the form of a planar fleece material, wherein said first layer is made of a thermoplastic polyolefin and has a film base sheet and a number of central ribs having an initial height prior to being welded to said planar fleece material, each rib defining an area of increased film thickness, on at least one face of the film base sheet, said at least one second layer in the form of a planar fleece material being located on a face of said film having said central ribs, wherein said fleece material has a thickness of 0.25 mm or less and comprises glass fibers, polyester fibers or a mixture of glass fibers and polyester fibers and wherein the at least one planar fleece material is bonded to said film by a number of welded joints such that the planar fleece material is located at the level of the surface of the film base sheet in the area of the welded joints and does not penetrate into the film base sheet, said planar fleece material being bonded to at least some of said central ribs of said film by the welded joints, wherein the height of the at least some of the central ribs forming said welded joints is decreased relative to said initial height.

2. Separator material according to claim 1, wherein the central ribs run vertically.

3. Separator material according to claim 2, further comprising a plurality of side edge ribs on each side edge area of said film, said side edge ribs being more densely spaced compared to said central ribs, and wherein there is an outermost central rib closest to each innermost side edge rib on each side edge area of said film, said outermost central rib having an initial height prior to being welded to said planar fleece material, and each said outermost central rib is welded to said planar fleece material by welded joints that comprise weld seams which run on each said outermost central rib and wherein the height of each said outermost central rib is decreased relative to said initial height.

4. Separator material according to claim 3, wherein the outermost central ribs are continuous ribs and said welded joints are continuous weld seams.

5. Separator material according to claim 3, wherein the outermost central ribs are discontinuous ribs and said welded joints are discontinuous weld seams.

6. Separator material according to claim 1, wherein the welded joints are spot-welded joints.

7. Separator material according to claim 1, wherein the polyolefin has a molecular weight of at least 300,000.

8. Separator material according to claim 7, wherein the polyolefin is polyethylene.

9. Separator material according to claim 8, wherein the microporous film is produced from polyethylene having a filler content of silica.

10. Separator material according to claim 1, wherein at least 50% of the pores of the microporous film have a diameter of 0.5 µm or less.

11. Separator material according to claim 1, wherein the microporous film has a thickness of from 0.1 to 0.6 mm in areas without central ribs.

12. Separator material according to claim 1, wherein the fleece material substantially consists of polyester fibers.

13. Separator material according to claim 1, wherein the fleece material comprises a mixture of glass fibers and polyester fibers.

14. Separator material according to claim 13, wherein the content of glass fibers in the mixture is not more than 70 wt. %.

15. Separator material according to claim 1, wherein the fleece material has a thickness of from 0.1 to 0.25 mm.

16. Process for the production of a separator material for forming a separator for a lead-acid accumulator, according to claim 1, with the steps: (a) provision of a microporous film, which is made of a thermoplastic polyolefin and has a film base sheet and a number of elevated height central ribs, each rib defining an area of increased film thickness, on at least one face of the film base sheet, (b) provision of at least one planar fleece material, (c) location of the at least one planar fleece material on a face of the film having said central ribs and (d) welding of the at least one planar fleece material with at least some of the central ribs of the film, such that the planar fleece material is located at the level of the surface of the film base sheet in the area of the welded joints and does not penetrate into the film base sheet.

17. Process according to claim 16, wherein the welding takes place by means of ultrasonic welding.

18. Process according to claim 16 or claim 17, wherein at least some of the central ribs of the microporous film have a height of from 0.5 to 0.6 mm and the welding takes place with these central ribs.

19. Process according to one of claims 16 or 17, wherein said planar fleece material has a thickness of from 0.1 to 0.25 mm.

20. Process according to claim 16, wherein the step of welding of the at least one planar fleece material with at least some of the central ribs of the film causes at least some of the central ribs to disappear completely during the welding process.

21. Process according to claim 16, wherein the step of locating the at least one planar fleece material on a face of the film having central ribs comprises gradually laying one of said at least one planar fleece material and said film having central ribs on the other in sections.

22. Process according to claim 16, wherein the step of locating the at least one planar fleece material on a face of the film having central ribs comprises gradually laying one of said at least one planar fleece material and said film having central ribs on the other continuously.

23. Separator material according to claim 1, wherein said film has edge areas, and wherein said edge areas of said film are not covered with said planar fleece material.

24. Separator material according to claim 23, wherein the width of said edge areas is between 5.5 and 9.5 mm.

25. Separator material according to claim 1, wherein said welded joints are ultrasonic welded joints.

26. Separator material for forming a separator for a lead-acid accumulator, wherein the separator material comprises a first layer in the form of a microporous film, and at least one second layer in the form of a planar fleece material, wherein said first layer is made of a thermoplastic polyolefin and has a film base sheet and a number of central ribs having an initial height prior to being welded to said planar fleece material, each rib defining an area of increased film thickness, on at least one face of the film base sheet, said at least one second layer in the form of a planar fleece material being located on a face of said film having said central ribs, wherein said fleece material has a thickness of 0.25 mm or less and is narrower than said microporous film so as to create edge areas where the microporous film is not covered, and comprises glass fibers, polyester fibers or a mixture of glass fibers and polyester fibers and wherein the at least one planar fleece material is bonded to said film by a number of welded joints such that the height of the central ribs forming said welded joints is decreased relative to said initial height, and such that the planar fleece material is located at the level of the surface of the film base sheet in the area of the welded joints and does not penetrate into the film base sheet.

27. Separator material according to claim 1, wherein the polyolefin has a melt index under normal conditions of substantially 0.

28. Separator material according to claim 1, wherein the polyolefin has a viscosity number of not less than 600 ml/g.

* * * * *